United States Patent
Gallagher

(10) Patent No.: US 8,462,233 B2
(45) Date of Patent: Jun. 11, 2013

(54) SPECIAL EFFECTS IN IMAGE SENSORS

(75) Inventor: James Kevan Gallagher, Lothian (GB)

(73) Assignee: STMicroelectronics (R&D) Ltd., Marlow Bucks (GB)

( * ) Notice: Subject to any disclaimer, the term of this patent is extended or adjusted under 35 U.S.C. 154(b) by 1446 days.

(21) Appl. No.: 11/622,223

(22) Filed: Jan. 11, 2007

(65) Prior Publication Data
US 2008/0019588 A1    Jan. 24, 2008

(30) Foreign Application Priority Data
Jul. 21, 2006 (EP) ...................................... 06270071

(51) Int. Cl.
*H04N 5/262* (2006.01)
(52) U.S. Cl.
USPC ........................................................ 348/239
(58) Field of Classification Search
USPC ............... 348/259, 270, 271, 273, 277, 278, 348/279, 222.1, 223.1, 254, 207.99, 255, 348/345, 229.1, 230.1, 239, 340; 382/163
See application file for complete search history.

(56) References Cited

U.S. PATENT DOCUMENTS

| | | | |
|---|---|---|---|
| 6,181,438 B1 * | 1/2001 | Bracco et al. | 358/1.9 |
| 6,430,313 B1 | 8/2002 | Smith et al. | 382/167 |
| 6,683,652 B1 * | 1/2004 | Ohkawara et al. | 348/347 |
| 6,940,546 B2 * | 9/2005 | Gallagher | 348/224.1 |
| 7,085,008 B2 * | 8/2006 | Weldy | 358/1.9 |
| 7,453,502 B2 * | 11/2008 | Schweng | 348/241 |
| 2001/0007468 A1 * | 7/2001 | Sugimoto et al. | 348/71 |
| 2002/0118894 A1 | 8/2002 | Morimoto et al. | 382/305 |

FOREIGN PATENT DOCUMENTS

| | | |
|---|---|---|
| EP | 1251461 | 10/2002 |
| EP | 1564681 | 8/2005 |

OTHER PUBLICATIONS http://web.archive.org/web/20051215000000/http://en.wikipedia.org/wiki/vignetting.*
http://web.archive.org/web/20051215000000/http:/en.wikipedia.org/wiki/vignettin.*
Yu, Practical Anti-Vignetting Methods for Digital Cameras, IEEE Transactions on Consumer Electronics, IEEE Service Center, New York, NY, vol. 50, No. 4, Nov. 2004, pp. 975-983.

* cited by examiner

*Primary Examiner* — Tuan Ho
*Assistant Examiner* — Ahmed A Berhan
(74) *Attorney, Agent, or Firm* — Allen, Dyer, Doppelt, Milbrath & Gilchrist, P.A.

(57) ABSTRACT

An image sensor may selectively produce an effect, such as simulating a night vision scope, by controlling existing hardware to vary anti-vignetting and gamma.

29 Claims, 1 Drawing Sheet

SPECIAL EFFECTS IN IMAGE SENSORS

FIELD OF THE INVENTION

The invention relates to the production of special effects in image sensors.

BACKGROUND OF THE INVENTION

Image sensors are in common use in consumer products, such as mobile phones with cameras, webcams and digital still cameras. There is a desire to enable such image sensors to provide special visual effects. However, such special visual effects commonly require additional circuitry, which adds to cost, complexity and power consumption.

SUMMARY OF THE INVENTION

An object of the present invention is to provide an apparatus and method for selective provision of special effects in image sensors, especially but not exclusively, in consumer products, such as mobile phones.

This and other objects, advantages and features in accordance with the present invention are provided by a solid state image sensor comprising an array of color pixels and means or circuit for reading out pixel values to provide an image signal. The image sensor may have anti-vignetting means or circuit and gamma control means or circuit. The anti-vignetting means may vary the gain across the image to counteract vignetting caused by an imaging lens, or by interaction between an imaging lens and microlenses on the sensor. The gamma control means may vary gamma in each of the color channels.

The image sensor may also comprise a selectively operable special effect generator which, when operated, provides one or both of the following:

(a) controlling the anti-vignetting means to have a low or negative value at an edge of the image to produce a dark border around the image, and (b) controlling the gamma control means to have a selected gamma or gain factors in the color channels to produce a monochrome image.

The special effects generator is effective to produce both (a) and (b) simultaneously. The pixel array is typically an array of RGB pixels, and the special effects generator may set either the gamma or gain for red and blue channels to zero, thereby producing a green monochrome image.

The image sensor may include means or circuit for changing the output of selected rows and columns of the pixel array. The special effects generator is may be operable to change the output of a row, or a plurality of adjacent rows and a column, or a plurality of adjacent columns, thus forming a cross on the image.

The means for changing the output of selected rows and columns is operable to set the output of the selected row or column to black or to white, or to apply an offset to the data values, or to invert the data values, or to exclusive-or the data with a fixed value. The selected row(s) and column(s) may be in the center of the image.

Another aspect of the present invention is to provide a method of generating special effects in an image sensor. The image sensor may have an array of color pixels and means or circuit for reading out pixel values to provide an image signal, anti-vignetting means operable to vary the gain across the image to counteract vignetting caused by an imaging lens or by interaction between an imaging lens and microlenses on the sensor, and gamma control means for varying the gamma in each of the color channels.

The method may comprise one or both of the following: (a) controlling the anti-vignetting means to have a low or negative value at an edge of the image to produce a dark border around the image; and (b) controlling the gamma control means to have selected gamma or gain factors in the color channels to produce a monochrome image. Both (a) and (b) may be produced simultaneously.

The pixel array is typically an array of KGB pixels, and either the gamma or gain for red and blue channels are set to zero, thereby producing a green monochrome image.

The image sensor may include means or circuit for changing the output of selected rows and columns of the pixel array. The method may include selectively changing the output of a row, or a plurality of adjacent row and a column, or a plurality of adjacent columns, thus forming a cross on the image.

The output of the selected row or column may be set to black or to white, or an offset may be applied to the data values, or the data values may be inverted, or the data may be exclusive-or'd with a fixed value. The selected row(s) and column(s) are preferably in the center of the image.

Other aspects of the present invention are directed to a camera comprising the foregoing image sensor, which may be a webcam or a digital still camera, a mobile telephone including such a camera, and an electronic game incorporating the foregoing method.

BRIEF DESCRIPTION OF THE DRAWINGS

An embodiment of the present invention will now be described, by way of example only, with reference to the drawings, in which.

DETAILED DESCRIPTION OF THE PREFERRED EMBODIMENTS

Figure 1:
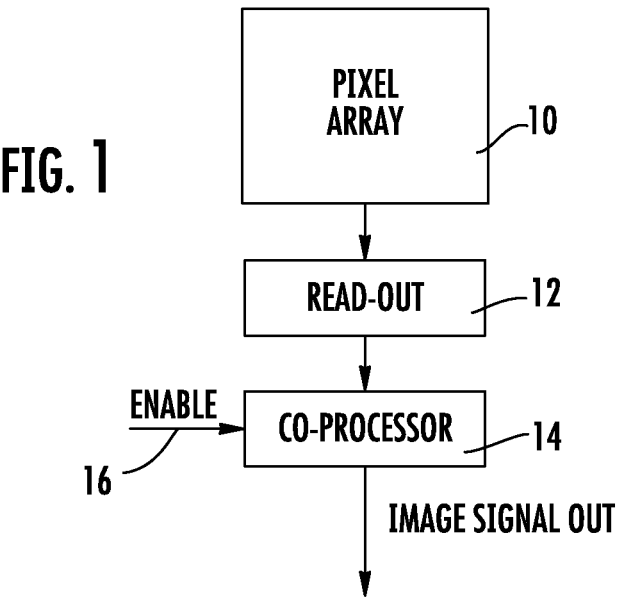
FIG. 1 is a block diagram of an apparatus embodying the present invention.

Referring to FIG. 1, an image sensor comprises a pixel array 10 and read-out circuitry 12. The pixel array 10 may, for example, be a CMOS array in which each pixel comprises a photodiode and associated transistors, as is well known in the art. An image is formed on the array 10 by an imaging lens (not shown) and color filters associated with the pixels. The color filters will most suitably be RGB filters arranged in a Bayer pattern.

The read-out circuitry 12 is operable to read out pixel values sequentially to form an image data stream, and will typically include noise reduction features such as correlated double sampling, and analog to digital conversion.

The image processor further comprises a co-processor 14 that performs signal processing functions on the data stream from the read-out circuitry 12. As is conventional, the signal processing functions in the present example include anti-vignetting (i.e., the adjustment of gain across the area of the array to compensate for reduction in brightness from center to edge caused by variation of optical performance of the imaging lens), and gamma correction on each of the RGB channels (i.e., correction for different performance of kGB phosphors and for their non-linearity).

The co-processor 14 in the present example also has a feature that is known in some existing image sensors, which is the ability to selectively change the output from selected rows and columns. This feature is provided in order to perform tests and adjustments during manufacture, but remains embedded in the image sensor. The selectable change is typically setting all pixels in the chosen row or column to black, but other changes may be used for the same purpose, such as setting all pixels to white, or varying the pixel values by an operation such as applying an offset, inverting or performing exclusive-or with data of a fixed value.

All of the foregoing is conventional and well known in the art. However, the image sensor advantageously produces special effects. As shown in FIG. 1, the image sensor has a special effect enable input 16. This may be a specially provided key, or a selection from a software menu. When operated, the special effect enable input 16 causes the co-processor 14 to perform three operations, namely:

(1) The anti-vignetting control is set to a negative value that forces a circular image with a black surrounding.

(2) The gamma controls on the red and blue channels are set to zero or low values and gamma for the green channel is increased, thus producing an image that is essentially green monochrome.

(3) The central row and central column of pixels are disabled, thus producing a black cross centered across the image.

With regard to step (2), as an alternative to using gamma the same effect can be produced by controlling gain in the color channels. In a typical coprocessor or processor the RGB data undergo matrixing before gamma is applied, and it would be possible to set either the input or the output of the matrix to zero for the red and blue channels.

Figure 2:
FIG. 2 illustrates the effect achieved by an apparatus embodying the present invention.

An example of the resulting image is seen in FIG. 2. The image simulates the popular conception of a night scope, image intensifier view. Such an image provides an optionally useable playful effect to a camera system that adds a differentiating feature and adds value. The effect can be achieved without adding to the camera circuitry, and can thus be provided at minimal cost.

It is desirable that selection of the special effect also causes the zoned exposure control that is conventionally provided in the image sensor to be set to use the center of the image so that correct exposure is achieved.

Detailed methods of performing these functions will be readily apparent to those in the art and will not be described in detail herein. It will typically be most convenient to use embedded software to control the special effect function, for example by the co-processor host writing appropriate values to registers controlling the anti-vignetting, gamma, row/column disable and exposure control zone functions.

Modifications of the above embodiment may be used. For example, the special effect may comprise only one or two of the above changes (1)-(3). Also, a different color effect may be used by suitable adjustment of channel gamma values, for example, to obtain a sepia effect.

The image sensor may typically be used in a camera within a mobile phone. However, it may also be used in other types of cameras, or incorporated in an electronic game.

That which is claimed:

1. A solid state image sensor comprising:
an array of color pixels;
a read-out circuit for reading pixel values from said array of color pixels to provide an image signal; and
a processor coupled to said read-out circuit and configured to perform
anti-vignetting on the image signal for varying a gain across an image to counteract vignetting, and
gamma correction on the image signal for varying gamma in each of the color channels;
said processor being selectively operable to provide a special effect generator that controls the anti-vignetting to have a value at an edge of the image to produce a dark border around the image to give the impression of a night-vision special effect.

2. A solid state image sensor according to claim 1, wherein the special effects generator also controls the gamma correction to have selected gamma or gain factors in color channels to produce a monochrome image.

3. A solid state image sensor according to claim 2, wherein the special effects generator simultaneously controls anti-vignetting and the gamma correction.

4. A solid state image sensor according to claim 1, wherein said array of color pixels comprises an array of RGB pixels; and wherein the special effects generator sets either gamma or gain for red and blue channels to zero for producing a green monochrome image.

5. A solid state image sensor according to claim 1, wherein said processor is operable for changing an output of selected rows and columns of said array of pixels; and wherein the special effects generator is operable for performing at least one of the following: changing an output of a row, changing a plurality of adjacent rows and a column, and changing a plurality of adjacent columns, thus forming a cross on the image.

6. A solid state image sensor according to claim 5, wherein the special effects generator is operable for performing at least one of the following: setting the output of a selected row or column to black or white, applying an offset to data values, inverting the data values and exclusive-oring the data with a fixed value.

7. A solid state image sensor according to claim 5, wherein a selected row and column are in a center of the image.

8. A solid state image sensor comprising:
an array of color pixels;
a read-out circuit for reading pixel values from said array of color pixels to provide an image signal; and
a processor coupled to said read-out circuit and configured to perform
anti-vignetting on the image signal for varying a gain across an image to counteract vignetting, and
gamma correction on the image signal for varying gamma in each of the color channels;
said processor being selectively operable to provide a special effect generator that controls the anti-vignetting to have a value at an edge of the image to produce a dark border around the image to give the impression of a night-vision special effect, and controls the gamma correction to have selected gamma or gain factors in color channels to produce a monochrome image.

9. A solid state image sensor according to claim 8, wherein the special effects generator simultaneously controls anti-vignetting and the gamma correction.

10. A solid state image sensor according to claim 8, wherein said array of color pixels comprises an array of RGB pixels; and wherein the special effects generator sets either gamma or gain for red and blue channels to zero for producing a green monochrome image.

11. A solid state image sensor according to claim 8, wherein said processor is operable for changing an output of selected rows and columns of said array of pixels; and wherein the special effects generator is operable for performing at least one of the following: changing an output of a row, changing a plurality of adjacent rows and a column, and changing a plurality of adjacent columns, thus forming a cross on the image.

12. A solid state image sensor according to claim 11, wherein the special effects generator is operable for performing at least one of the following: setting the output of a selected row or column to black or white, applying an offset to data values, inverting the data values and exclusive-oring the data with a fixed value.

13. A solid state image sensor according to claim 11, wherein a selected row and column are in a center of the image.

14. An apparatus comprising:
an image lens;
a solid state image sensor adjacent said image lens and comprising
an array of color pixels for receiving an image formed by said image lens,
a read-out circuit for reading pixel values from said array of color pixels to provide an image signal, and
a processor coupled to said read-out circuit and configured to perform the following
anti-vignetting on the image signal for varying a gain across an image to counteract vignetting, and
gamma correction on the image signal for varying gamma in each of the color channels,
said processor being selectively operable to provide a special effect generator that, when operated, provides at least one of the following
(a) controlling the anti-vignetting to have a value at an edge of the image to produce a dark border around the image to give the impression of a night-vision special effect, and
(b) controlling the gamma correction to have selected gamma or gain factors in color channels to produce a monochrome image.

15. An apparatus according to claim 14, wherein the special effects generator provides (a) and (b) simultaneously.

16. An apparatus according to claim 14, wherein said array of color pixels comprises an array of RGB pixels; and wherein the special effects generator sets either gamma or gain for red and blue channels to zero for producing a green monochrome image.

17. An apparatus according to claim 14, wherein said processor is operable for changing an output of selected rows and columns of said array of pixels; and wherein the special effects generator is operable for performing at least one of the following: changing an output of a row, changing a plurality of adjacent rows and a column, and changing a plurality of adjacent columns, thus forming a cross on the image.

18. An apparatus according to claim 17, wherein the special effects generator is operable for performing at least one of the following: setting the output of a selected row or column to black or white, applying an offset to data values, inverting the data values and exclusive-oring the data with a fixed value.

19. An apparatus according to claim 17, wherein a selected row and column are in a center of the image.

20. An apparatus according to claim 14, wherein said image lens and said solid state image sensor are configured so that the apparatus is a camera.

21. An apparatus according to claim 20, wherein the camera comprises at least one of a webcam and a digital still camera.

22. An apparatus according to claim 20, wherein the apparatus is configured as a mobile telephone comprising the camera.

23. An apparatus according to claim 14, wherein the apparatus is configured as an electronic game.

24. A method of generating special effects in a solid state image sensor comprising a solid State image sensor comprising an array of color pixels, a read-out circuit for reading pixel values from the array of color pixels to provide an image signal, and a processor coupled to the read-out circuit for performing anti-vignetting on the image signal for varying a gain across an image to counteract vignetting, and gamma correction on the image signal for varying gamma in each of the color channels, the processor being selectively operable for providing a special effect generator, the method comprising:
selectively operating the special effect generator to provide at least one of the following
(a) controlling the anti-vignetting to have a value at an edge of the image to produce a dark border around the image to give the impression of a night-vision special effect, and
(b) controlling the gamma correction to have selected gamma or gain factors in color channels to produce a monochrome image.

25. A method according to claim 24, wherein the special effects generator provides (a) and (b) simultaneously.

26. A method according to claim 24, wherein the array of color pixels comprises an array of RGB pixels; and wherein the special effects generator sets either gamma or gain for red and blue channels to zero for producing a green monochrome image.

27. A method according to claim 24, wherein the processor is operable for changing an output of selected rows and columns of the array of pixels; and wherein the special effects generator is operable for performing at least one of the following: changing an output of a row, changing a plurality of adjacent rows and a column, and changing a plurality of adjacent columns, thus forming a cross on the image.

28. A method according to claim 27, wherein the special effects generator is operable for performing at least one of the following: setting the output of a selected row or column to black or white, applying an offset to data values, inverting the data values and exclusive-oring the data with a fixed value.

29. A method according to claim 27, wherein a selected row and column are in a center of the image.

* * * * *